(12) United States Patent
Karni

(10) Patent No.: US 12,439,179 B2
(45) Date of Patent: Oct. 7, 2025

(54) OFFSET COMPENSATION

(71) Applicant: SEMICONDUCTOR DEVICES LTD, D.N. Misgav (IL)

(72) Inventor: Yoram Karni, Qiryat Tivon (IL)

(73) Assignee: SEMICONDUCTOR DEVICES LTD, D.N. Misgav (IL)

( * ) Notice: Subject to any disclaimer, the term of this patent is extended or adjusted under 35 U.S.C. 154(b) by 0 days.

(21) Appl. No.: 18/802,100

(22) Filed: Aug. 13, 2024

(65) Prior Publication Data

US 2025/0063267 A1     Feb. 20, 2025

(30) Foreign Application Priority Data

Aug. 17, 2023  (IL) .......................................... 305297

(51) Int. Cl.
| | |
|---|---|
| *H04N 25/671* | (2023.01) |
| *H04N 17/00* | (2006.01) |
| *H04N 25/20* | (2023.01) |
| *H04N 25/51* | (2023.01) |

(52) U.S. Cl.
CPC ......... *H04N 25/671* (2023.01); *H04N 17/002* (2013.01); *H04N 25/20* (2023.01); *H04N 25/51* (2023.01)

(58) Field of Classification Search
None
See application file for complete search history.

(56) References Cited

U.S. PATENT DOCUMENTS

| | | | |
|---|---|---|---|
| 7,016,550 B2 | 3/2006 | Alderson et al. | |
| 8,203,116 B2 | 6/2012 | Young | |
| 8,503,821 B2 | 8/2013 | Hogasten | |
| 2001/0042825 A1 | 11/2001 | Young | |
| 2011/0216201 A1* | 9/2011 | McAndrew | G06T 7/80 348/148 |
| 2012/0091340 A1 | 4/2012 | Young | |
| 2012/0320217 A1* | 12/2012 | Hogasten | H04N 25/674 348/E5.09 |
| 2015/0312489 A1 | 10/2015 | Hoelter et al. | |
| 2017/0163908 A1* | 6/2017 | Bailey | G06T 7/20 |
| 2018/0184028 A1 | 6/2018 | Saragaglia et al. | |
| 2023/0025165 A1* | 1/2023 | Allen | C25D 13/22 |

FOREIGN PATENT DOCUMENTS

WO    2014047075 A1    3/2014

* cited by examiner

*Primary Examiner* — Clifford Hilaire
(74) *Attorney, Agent, or Firm* — Vorys, Sater, Seymour and Pease, LLP; Anthony P. Venturino; Maryellen Feehery Hank

(57) ABSTRACT

An image processing method including: receiving a plurality of image frames from a detector array, wherein each image frame includes a measurement array of pixel values; computing a difference array from each measurement array, to provide a plurality of difference arrays, wherein the elements of the difference array comprise: a selected element which is set to zero; elements which are computed as a difference between: a corresponding measurement array element; and another element of the measurement array; or a linear combination of other elements of the measurement array; averaging the plurality of difference arrays to provide an average difference array; and determining an offset array using the average difference array.

20 Claims, 9 Drawing Sheets

$$x$$

| $x_1$ | $x_2$ | $x_3$ | ... | $x_n$ |

$$p \quad = \quad A \quad \quad \quad x$$

| $x_1$ |   | 1 | 0 | 0 | 0 | 0 |   | $x_1$ |
| $x_1$ |   | 1 | 0 | 0 | 0 | 0 |   | $x_2$ |
| $x_2$ |   | 0 | 1 | 0 | 0 | 0 |   | ... |
| ... |   | 0 | 0 | 1 | 0 | 0 |   | ... |
| $x_{n-1}$ |   | 0 | 0 | 0 | 1 | 0 |   | $x_n$ |

$$\Delta(t) = Dx(t) = x(t) - p(t)$$

| 0 | $x_2-x_1$ | ... | ... | $x_n-x_{n-1}$ |

$$\bar{\Delta} = \text{avg}[\Delta(t), \Delta(t-1), \Delta(t-2)\ ...]$$

$\Delta(t)$ $\Delta(t-1)$ $\Delta(t-2)$

| 0 | $x_2-x_1$ | ... | ... | $x_n-x_{n-1}$ |

$$o \quad = \quad E^{-1} \quad \quad \bar{\Delta}$$

| $o_1$ |   | 1 | 0 | 0 | 0 | 0 |   | $\bar{\Delta}_1=0$ |
| $o_2$ |   | 1 | 0 | 0 | 0 | 0 |   | $\bar{\Delta}_2$ |
| ... |   | 1 | 1 | 0 | 0 | 0 |   | ... |
| ... |   | 1 | 1 | 1 | 0 | 0 |   | ... |
| $o_n$ |   | 1 | 1 | 1 | 1 | 0 |   | $\bar{\Delta}_n$ |

$$x^c(t) = x(t) - o$$

| $x_1-o_1$ | $x_2-o_2$ | ... | ... | $x_n-o_n$ | x

| $x_1$ | $x_2$ | $x_3$ | ... | $x_n$ | p1 = A1 x

| $x_1$ |
| $x_1$ |
| $\frac{1}{2}(x_1+x_2)$ |
| $\frac{1}{3}(x_1-x_2-x_3)$ |
| ... |

| 1 | 0 | 0 | 0 | 0 |
| 1 | 0 | 0 | 0 | 0 |
| 1/2 | 1/2 | 0 | 0 | 0 |
| 1/3 | 1/3 | 1/3 | 0 | 0 |
| 1/4 | 1/4 | 1/4 | 1/4 | 0 |

| $x_1$ |
| $x_2$ |
| ... |
| ... |
| $x_n$ |

Δ1(t) = D1 x(t) = x(t)−p1(t)

| 0 | $x_2-x_1$ | $x_3-\frac{1}{2}(x_1+x_2)$ | $x_4-\frac{1}{3}(x_1-x_2-x_3)$ | ... |

$$\overline{\Delta 1} = \text{avg}[\Delta_1(t), \Delta_1(t-1), \Delta_1(t-2)\ ...]$$

o1 = E1$^{-1}$ $\overline{\Delta 1}$

| $o1_1$ |
| $o1_2$ |
| ... |
| ... |
| $o1_n$ |

| 1 | 0 | 0 | 0 | 0 |
| 1 | 0 | 0 | 0 | 0 |
| 1 | 1/2 | 0 | 0 | 0 |
| 1 | 1/2 | 1/3 | 0 | 0 |
| 1 | 1/2 | 1/3 | 1/4 | 0 |

| $\overline{\Delta 1}_1$ |
| $\overline{\Delta 1}_2$ |
| ... |
| ... |
| $\overline{\Delta 1}_n$ | x$^c$(t) = x(t)−o1

| $x_1-o1_1$ | $x_2-o1_2$ | ... | ... | $x_n-o1_n$ |

X

| $x_{11}$ | $x_{12}$ | $x_{13}$ | $x_{14}$ | $x_{15}$ |
|---|---|---|---|---|
| $x_{21}$ | $x_{22}$ | $x_{23}$ | $x_{24}$ | $x_{25}$ |
| $x_{31}$ | $x_{32}$ | $x_{33}$ | $x_{34}$ | $x_{35}$ |
| $x_{41}$ | $x_{42}$ | $x_{43}$ | $x_{44}$ | $x_{45}$ |
| $x_{51}$ | $x_{52}$ | $x_{53}$ | $x_{54}$ | $x_{55}$ |

FIG. 6A $\Delta 2(t)$

| $x_{11}-\tfrac{1}{2}(x_{21}+x_{12})$ | $x_{12}-\tfrac{1}{2}(x_{22}+x_{13})$ | $x_{13}-x_{23}$ | $x_{14}-\tfrac{1}{2}(x_{13}+x_{24})$ | $x_{15}-\tfrac{1}{2}(x_{14}+x_{25})$ |
|---|---|---|---|---|
| $x_{21}-\tfrac{1}{2}(x_{13}+x_{22})$ | $x_{22}-\tfrac{1}{2}(x_{32}+x_{23})$ | $x_{23}-x_{33}$ | $x_{24}-\tfrac{1}{2}(x_{23}+x_{34})$ | $x_{25}-\tfrac{1}{2}(x_{24}+x_{35})$ |
| $x_{31}-x_{32}$ | $x_{32}-x_{33}$ | 0 | $x_{34}-x_{33}$ | $x_{35}-x_{34}$ |
| $x_{41}-\tfrac{1}{2}(x_{13}+x_{24})$ | $x_{42}-\tfrac{1}{2}(x_{32}+x_{34})$ | $x_{43}-x_{33}$ | $x_{44}-\tfrac{1}{2}(x_{43}+x_{34})$ | $x_{45}-\tfrac{1}{2}(x_{44}+x_{35})$ |
| $x_{51}-\tfrac{1}{2}(x_{14}+x_{25})$ | $x_{52}-\tfrac{1}{2}(x_{53}+x_{42})$ | $x_{53}-x_{43}$ | $x_{54}-\tfrac{1}{2}(x_{35}+x_{44})$ | $x_{55}-\tfrac{1}{2}(x_{54}+x_{45})$ |

FIG. 6B o2

| $\Delta_{11}+\tfrac{1}{2}(o_{21}+o_{12})$ | $\Delta_{12}+\tfrac{1}{2}(o_{22}+o_{13})$ | $\Delta_{13}+o_{23}$ | $\Delta_{14}+\tfrac{1}{2}(o_{13}+o_{24})$ | $\Delta_{15}+\tfrac{1}{2}(o_{14}+o_{25})$ |
|---|---|---|---|---|
| $\Delta_{21}+\tfrac{1}{2}(o_{13}+o_{22})$ | $\Delta_{22}+\tfrac{1}{2}(o_{32}+o_{23})$ | $\Delta_{23}$ | $\Delta_{24}+\tfrac{1}{2}(o_{23}+o_{34})$ | $\Delta_{25}+\tfrac{1}{2}(o_{24}+o_{35})$ |
| $\Delta_{31}+o_{32}$ | $\Delta_{32}$ | 0 | $\Delta_{34}$ | $\Delta_{35}+o_{34}$ |
| $\Delta_{41}+\tfrac{1}{2}(o_{13}+o_{24})$ | $\Delta_{42}+\tfrac{1}{2}(o_{32}+o_{34})$ | $\Delta_{43}$ | $\Delta_{44}+\tfrac{1}{2}(o_{43}+o_{34})$ | $\Delta_{45}+\tfrac{1}{2}(o_{44}+o_{35})$ |
| $\Delta_{51}+\tfrac{1}{2}(o_{14}+o_{25})$ | $\Delta_{52}+\tfrac{1}{2}(o_{53}+o_{42})$ | $\Delta_{53}+o_{43}$ | $\Delta_{54}+\tfrac{1}{2}(o_{35}+o_{44})$ | $\Delta_{55}+\tfrac{1}{2}(o_{54}+o_{45})$ |

FIG. 6C

OFFSET COMPENSATION

TECHNOLOGICAL FIELD

The present disclosure, in some embodiments, thereof, relates to compensating for non-uniform behavior of different detectors of a detector array and, more particularly, but not exclusively, to compensating offsets of detectors of the detector array.

BACKGROUND ART

U.S. Pat. No. 8,503,821 discloses: "Systems and methods provide scene-based non-uniformity correction for infrared images, in accordance with one or more embodiments. For example in one embodiment, a method of processing infrared images of a scene captured by an infrared image sensor comprising a plurality of sensor elements includes receiving a first frame comprising a first plurality of pixel data of a first infrared image; receiving a second frame comprising a second plurality of pixel data of a second infrared image; determining frame-to-frame motion between the first frame and the second frame, wherein the frame-to-frame motion identifies portions of the first and second pixel data corresponding to identical scene coordinates captured by different sensor elements for the first and second frames; determining irradiance differences between the first and second portions of pixel data; and determining pixel offset information for scene based non-uniformity correction terms based on the irradiance differences and the frame-to-frame motion."

U.S. Pat. No. 8,203,116 discloses: "In various embodiments, a method and system for compensating non-uniformities among detector elements of a detector array, without the use of dither mirrors or requirement of scene motion for non-uniformity correction achieved by computing scene spatial gradient and temporal gradient of image frames of the scene captured by the detector array at different times, and utilizing both the scene spatial and temporal gradients in detailed local gradient processing. Such local gradient processing may include computing masks to preserve spatial scene details, while eliminating scene noise (e.g., fixed pattern noise) from the captured image frames and correcting non-uniformity among detector elements."

U.S. Pat. No. 7,016,550 discloses: "An approach for processing image data is described. The method comprises correcting a frame of image data received from a detector using existing correction coefficients that comprise a plurality of offset coefficients corresponding to a plurality of detector elements. The method also comprises calculating an update parameter for each detector element using pixel data generated from the correction. The update parameter for a given detector element is calculated from multiple difference values determined from a given pixel value of the pixel data and multiple adjacent pixel values. The given pixel value corresponds to the given detector element. Each difference value is determined by subtracting one of the multiple adjacent pixel values from the given pixel value. The method comprises identifying offset coefficients whose existing values are to remain unchanged based upon the update parameters and changing existing values of offset coefficients other than those identified to remain unchanged."

Acknowledgement of the above references herein is not to be inferred as meaning that these are in any way relevant to the patentability of the presently disclosed subject matter.

GENERAL DESCRIPTION

Following is a non-exclusive list of some exemplary embodiments of the disclosure. The present disclosure also includes embodiments which include fewer than all the features in an example and embodiments using features from multiple examples, even if not listed below.

Example 1. An image processing method comprising:
receiving a plurality of image frames from a detector array, wherein each image frame includes a measurement array of pixel values;
computing a difference array from each measurement array, to provide a plurality of difference arrays, wherein the elements of said difference array comprise:
a selected element which is set to zero;
elements which are computed as a difference between:
a corresponding measurement array element; and
another element of the measurement array;
or
a linear combination of other elements of the measurement array;
averaging said plurality of difference arrays to provide an average difference array; and
determining an offset array using said average difference array Example 2. The image processing method according to Example 1, wherein said determining an offset array includes determining an offset for each detector of said detector array, relative to said selected element of the detector array, based on assuming that said average difference array is representative of differences between offsets of the detectors Example 3. The image processing method according to any one of Examples 1-2, wherein said plurality of image frames are produced by said detector array while said detector array moves with respect to a field of view Example 4. The image processing method according to any one of Examples 1-3, wherein said computing, for each measurement array comprises applying a difference operator to each said measurement array Example 5. The image processing method according to Example 4, wherein said determining said offset array comprises applying an inverse of said difference operator to said average difference array Example 6. The image processing method according to any one of Examples 4-5, wherein said difference operator is selected so that said selected element of said difference array has a value of zero Example 7. The image processing method according to any one of Examples 1-6, wherein said linear combination comprises, for each array element except for said selected element, a difference between a neighboring measurement array element and the array element Example 8. The image processing method according to any one of Examples 1-6, wherein said linear combination comprises an average of a sum of said other elements Example 9. The image processing method according to Example 8, wherein said sum is a weighted sum of said other elements Example 10. The image processing method according to Example 9, wherein said other elements comprise a plurality of neighboring measurement array elements to a measurement array element corresponding to said difference element being computed Example 11. The image processing method according to any one of Examples 1-10, comprising receiving an additional measurement array and correcting said additional measurement array using said offset array to provide a corrected measurement array Example 12. The image processing method according to Example 11, wherein said correcting comprises, for each element of said measurement array, subtracting a value of a corresponding element of said offset array Example 13. The image processing method according to any one of Examples 11-12, comprising outputting said corrected measurement array Example 14. The image processing method according to any one of Examples 11-13, comprising displaying said correcting measurement array Example 15. The image processing method according to any one of Examples 11-14, comprising:
  gain compensating each said measurement array, prior to said determining; and
  gain compensating said additional measurement array Example 16. The image processing method according to Example 15, wherein said gain compensating comprises receiving a gain calibration value for each detector and multiplying each element of said measurement array with an associated gain calibration value Example 17. The image processing method according to any one of Example 11-15, comprising: performing said computing for said additional measurement array to provide an additional difference array; and
  repeating:
    said averaging for said for said plurality of difference arrays and said additional difference array; and
    and said determining to provide an updated offset array Example 18. An image processing method comprising:
receiving an image frame from a detector array, which image frame including a measurement array of pixel values;
computing a difference array where a selected element of said difference array is set to zero, and where each element of said difference array except for said selected element is computed as a difference between:
  a corresponding measurement array element; and
    another element of the measurement array; or
    a linear combination of other elements of the measurement array;
receiving previous difference data comprising one or more previously computed difference arrays associated with one or more previously received measurement arrays;
determining an average difference array using said difference array and said one or more previously computed difference arrays; and
determining an offset array using said average difference array Example 19. The image processing method according to Example 18, wherein determining an offset array comprises determining an offset for each detector of said detector array, relative to said selected element, based on assuming that said average difference array is representative of differences between offsets of the detectors Example 20. The image processing method according to any one of Examples 18-19, comprising correcting said measurement array using said offset array Example 21. The image processing method according to any one of Examples 18-20, comprising:
  receiving an additional measurement array; and
  correcting said additional measurement array using said offset array Example 22. A detector system comprising:
a detector array comprising a plurality of detectors, which detector array configured to provide image frames each image frame including a measurement array of pixel values, each pixel value provided by a detector of said plurality of detectors;
a processor configured to:
  compute, for each measurement array, a difference array, to provide a plurality of difference arrays, where a selected element of each said difference array is set to zero, and where each element of said difference array except for said selected element is computed as a difference between:
    a corresponding measurement array element; and
    another element of the measurement array; or
    a linear combination of other elements of the measurement array;
  determine an average difference array from said plurality of difference arrays; and
  determine an offset array using said average difference array Example 23. The detector system according to Example 22, comprising a memory;
  wherein said detector array provides image frames sequentially with time;
  wherein said processor is configured to:
    compute and save sequentially in said memory said plurality of difference arrays; and
    receive said plurality of difference arrays from said memory to determine said average difference array Example 24. The detector system according to any one of Examples 22-23, wherein said processor is configured to correct a received image frame, using said offset array to provide a corrected measurement array Example 25. The detector system according to Example 24, comprising a display configured to receive said corrected measurement array from said processor and display said corrected measurement array Example 26. The detector system according to any one of Examples 22-25, wherein said plurality of detectors include bolometer detectors Example 27. The detector system according to any one of Examples 22-26, wherein said plurality of detectors are configured to detect infrared light Example 28. The detector system according to Example 27, wherein each said pixel value is according to an intensity and/or wavelength of infrared light incident on a corresponding detector of said detector array Example 29. The detector system according to any one of Examples 22-28, wherein said processor is configured to compute said difference array by applying a difference operator to a corresponding measurement array Example 30. The detector system according to Example 29, wherein said processor is configured to determine said offset array by applying an inverse of said difference operator to said average difference array.

Unless otherwise defined, all technical and/or scientific terms used within this document have meaning as commonly understood by one of ordinary skill in the art/s to which the present disclosure pertains. Methods and/or materials similar or equivalent to those described herein can be used in the practice and/or testing of embodiments of the present disclosure, and exemplary methods and/or materials are described below. Regarding exemplary embodiments described below, the materials, methods, and examples are illustrative and are not intended to be necessarily limiting.

Some embodiments of the present disclosure are embodied as a system, method, or computer program product. For example, some embodiments of the present disclosure may take the form of an entirely hardware embodiment, an entirely software embodiment (including firmware, resident software, micro code, etc.) or an embodiment combining software and hardware aspects that may all generally be referred to herein as a "circuit," "module" and/or "system."

Implementation of the method and/or system of some embodiments of the present disclosure can involve performing and/or completing selected tasks manually, automatically, or a combination thereof. According to actual instrumentation and/or equipment of some embodiments of the method and/or system of the present disclosure, several selected tasks could be implemented by hardware, by software or by firmware and/or by a combination thereof, e.g., using an operating system.

For example, hardware for performing selected tasks according to some embodiments of the present disclosure could be implemented as a chip or a circuit. As software, selected tasks according to some embodiments of the present disclosure could be implemented as a plurality of software instructions being executed by a computational device e.g., using any suitable operating system.

In some embodiments, one or more tasks according to some exemplary embodiments of method and/or system as described herein are performed by a data processor, such as a computing platform for executing a plurality of instructions. Optionally, the data processor includes a volatile memory for storing instructions and/or data and/or a non-volatile storage e.g., for storing instructions and/or data. Optionally, a network connection is provided as well. User interface/s e.g., display/s and/or user input device/s are optionally provided.

Some embodiments of the present disclosure may be described below with reference to flowchart illustrations and/or block diagrams. For example illustrating exemplary methods and/or apparatus (systems) and/or and computer program products according to embodiments of the present disclosure. It will be understood that each step of the flowchart illustrations and/or block of the block diagrams, and/or combinations of steps in the flowchart illustrations and/or blocks in the block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart steps and/or block diagram block or blocks.

These computer program instructions may also be stored in a computer readable medium that can direct a computer (e.g., in a memory, local and/or hosted at the cloud), other programmable data processing apparatus, or other devices to function in a particular manner, such that the instructions stored in the computer readable medium can be used to produce an article of manufacture including instructions which implement the function/act specified in the flowchart and/or block diagram block or blocks.

The computer program instructions may also be run by one or more computational device to cause a series of operational steps to be performed e.g., on the computational device, other programmable apparatus and/or other devices to produce a computer implemented process such that the instructions which execute provide processes for implementing the functions/acts specified in the flowchart and/or block diagram block or blocks.

Some of the methods described herein are generally designed only for use by a computer, and may not be feasible and/or practical for performing purely manually, by a human expert. A human expert who wanted to manually perform similar tasks, might be expected to use different methods, e.g., making use of expert knowledge and/or the pattern recognition capabilities of the human brain, potentially more efficient than manually going through the steps of the methods described herein.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIGS. 6A-C are simplified schematics illustrating processing of image data, according to some embodiments of the disclosure;

In some embodiments, although non-limiting, in different figures, like numerals are used to refer to like elements, for example, element 112 in FIG. 1 corresponding to element 812 in FIG. 8.

DETAILED DESCRIPTION OF EMBODIMENTS

Figure 1:
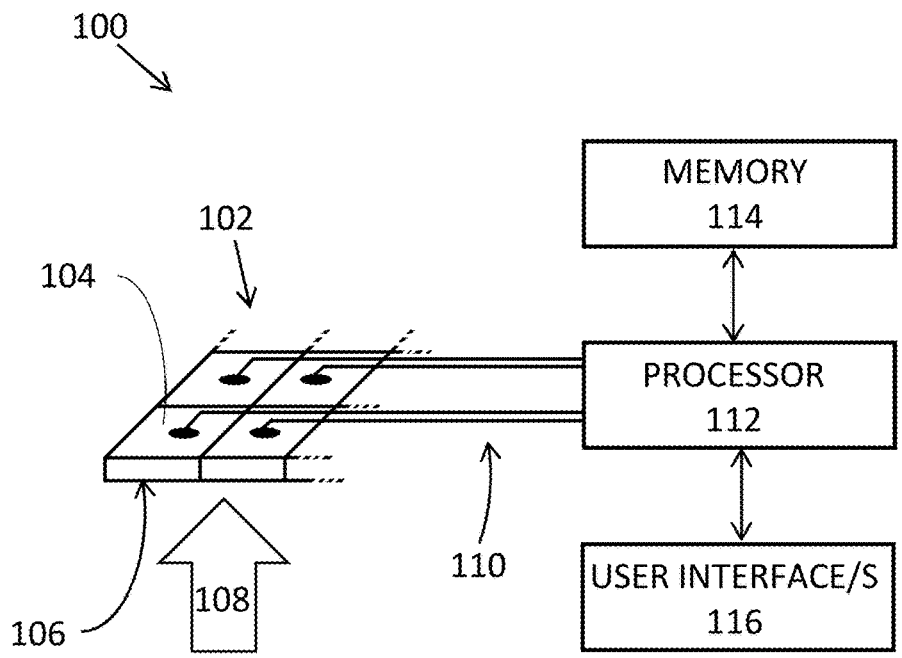
FIG. 1 is a simplified schematic of a detection system, according to some embodiments of the disclosure.

The present disclosure, in some embodiments, thereof, relates to compensating for non-uniform behavior of different detectors of a detector array and, more particularly, but not exclusively, to compensating offsets of detectors of the detector array.

Overview

A broad aspect of some embodiments of the disclosure relates to, for a detector array, using a plurality of image frame (also herein termed "measurement array") outputs of the detector array to estimate offsets of the detectors of the detector array. Where, in some embodiments, the detector array includes a plurality of detectors, each detector in a time period providing a pixel value (also herein termed a "measurement value"), the measurement array including a measurement value for each detector for the time period. Detector measurement values, in some embodiments, are each understood to be a combination of an offset (associated with the individual detector producing the measurement value) and a measurement signal. In some embodiments, processing is performed on measurement arrays to compensate for the offsets. Determining of the offsets from the measurement arrays themselves potentially avoids performing of dedicated calibration measurement/s to determine the offsets.

In some embodiments, it is assumed that differences in gain between detectors are relatively static e.g. with operating conditions and/or time. Where, in some embodiments, measurement arrays are gain-compensated (e.g. where different detectors have different gains) using gain calibration measurements e.g. prior performed measurements and stored gain calibrations determined from the measurements. A potential advantage of which is reduced complexity of real time compensation, as offset (e.g. and not gain), which may be, for example, more sensitive to changes in temperature, is determined using the measurement arrays e.g. during use of the detector array. In this document, the term "measurement array" may refer to a gain compensated measurement array. Where, for example, the measurement values have been pre-corrected according to gain calibration measurements.

Given detector measurement values (also herein termed "detection signals") are each understood to be a combination of an offset and a measurement signal, in some embodiments, the offsets are determined based on an assumption that, over time (e.g. for a plurality of measurement arrays received over time) collective differences (across the array) between the measurement signal part of the detection signals are a constant, e.g., zero.

In some embodiments, quality of image correction using the method described herein is dependent on how closely this (that the average of measurement signals across the measurement array and over time) assumption holds. Where, for example, the quality of the image correction depends on an extent to which the measurement data varies e.g. where the FOV of the detector changes and/or where imaging includes that of moving objects.

In some embodiments, offset compensation is performed when a field of view (FOV) of the detector is changing with time. For example, where the measurement arrays are acquired by a moving detector (or the detector acquires images of a scene moving with respect to the detector). In some embodiments, offset compensation is performed upon identifying use and/or movement of the detector and/or imaging system.

An aspect of some embodiments of the disclosure relates to determining an array representative of differences in measurement values (herein termed a "difference array"), for a plurality of measurement arrays and then using an average of the difference arrays to generate an estimated offset array.

In some embodiments, the difference array is produced by applying a difference operator to the measurement array. In some embodiments, applying the difference operator includes, for each element of the difference array, using a linear combination of elements of the measurement array.

In some embodiments, a difference array for a measurement array is produced by subtracting a prediction array from the measurement array, values of the prediction array being based on linear combinations of the measurement array.

In some embodiments, the difference operator (and a prediction operator configured to produce the predication array from the measurement array) determines elements of the difference array using one or more neighboring element of the measurement array to the element being determined. Where a neighboring element may be defined as an immediate neighboring pixel, a side of the neighboring pixel adjacent to a side of the element being determined, where, for example, in a rectangular pixel grid, four such pixels are present. In some embodiments, a neighboring element is defined as an element in a same region of the measurement array e.g. at most 1 or 2 or 3 pixels away from the element being determined.

A potential benefit of using neighboring elements is more rapid and/or accurate offset estimation. Based, for example, on an assumption that neighboring pixels are more likely to be measuring similar light signals than pixels far from each other. The difference array determined using such neighboring light signals potentially being more accurately representative of the offsets.

In some embodiments, in an average of the difference array, the signal values parts are assumed to be zero (e.g. according to the assumption that the signals average to a constant), the average difference array provides an estimation of an array of detector offsets to which the difference operator has been applied. To arrive at the estimation of detector offsets (herein also termed the "offset array") an inverse of the difference operator is applied to the average difference array. Where the offset array is then, in some embodiments, used to reduce measurement array/s to measurement signals. A potential advantage being that offset values are calculated for the entire detector array at once.

Once an offset array is determined, in some embodiments, it is used for a time period e.g. for a number of following frames (measurement arrays). The offset array, in some embodiments, is updated periodically, and/or upon identification of a trigger for example, one or more of; image quality has fallen, the type of scene being imaged has changed, there has been a change in imaging conditions e.g. temperature.

Alternatively, in some embodiments, the offset array is continually updated with new measurement array data.

A potential advantage of the method is that the method does not require comparison between different frames e.g. with associated memory requirements and/or calculation/s for analysis between frames.

In some embodiments, offset/s to pixel values are associated with one or more of non-uniformity between the elements of the detectors, and external extenders to the array (e.g. a lens). Where the external extender/s transmit a different intensity of radiation for different detectors and/or is a radiation source itself.

In some embodiments, the measurement response of the detectors (e.g. to light incident on the detectors) is linear with the intensity of the light, but where detectors may have different gains and/or offsets.

In some embodiments, gain for different detectors remains close to constant e.g. during temperature changes, where a majority of non-uniformity between detector measurements, in some embodiments, is associated with changes to offset variation (e.g. with operating temperature).

In some embodiments, for example, where the detectors are bolometer detectors for detection of infrared (IR) light, variation in pixel measurement values due to non-uniformity of the detectors is large with respect to differences in image data measurement values associated with the image being acquired. Variation in the distribution of the offset being much greater than distribution of measurement values within the measurement array. Or, in other words, a majority of a dynamic range of the detector measurement array image (optionally the gain corrected image) may be associated with offset errors. For example, in some embodiments, to the extent that features of the raw (or gain compensated) image may be indistinguishable from the raw (or gain compensated) measurement data image.

In some embodiments, the offset correction, also herein termed "non-uniformity correction" (NUC) is performed for one or more of IR, CT, ultrasound, PET, and LIDAR imaging modalities.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Exemplary System

FIG. 1 is a simplified schematic of a detection system 100, according to some embodiments of the disclosure.

In some embodiments, system 100 includes a detector array 102 which includes a plurality of detector pixels 104. Where detector pixels 104 of detector array 102 each produce an electrical measurement signal corresponding to electromagnetic radiation 108 incident on a surface 106 of detector array 102. In some embodiments, the electrical measurement signals are passed to a processor 112 via connection circuitry 110. In some embodiments, processor 112 processes the detector array electrical measurement signals. Where, in some embodiments, the processed signals are passed to one or more user interfaces 116 for display e.g. to a user. In some embodiments, a memory 114 is used to store processing data e.g. as described herein below, for processing of signals. Where, for example, the data stored is representative of previous measurement signals.

Exemplary Methods

Figure 2:
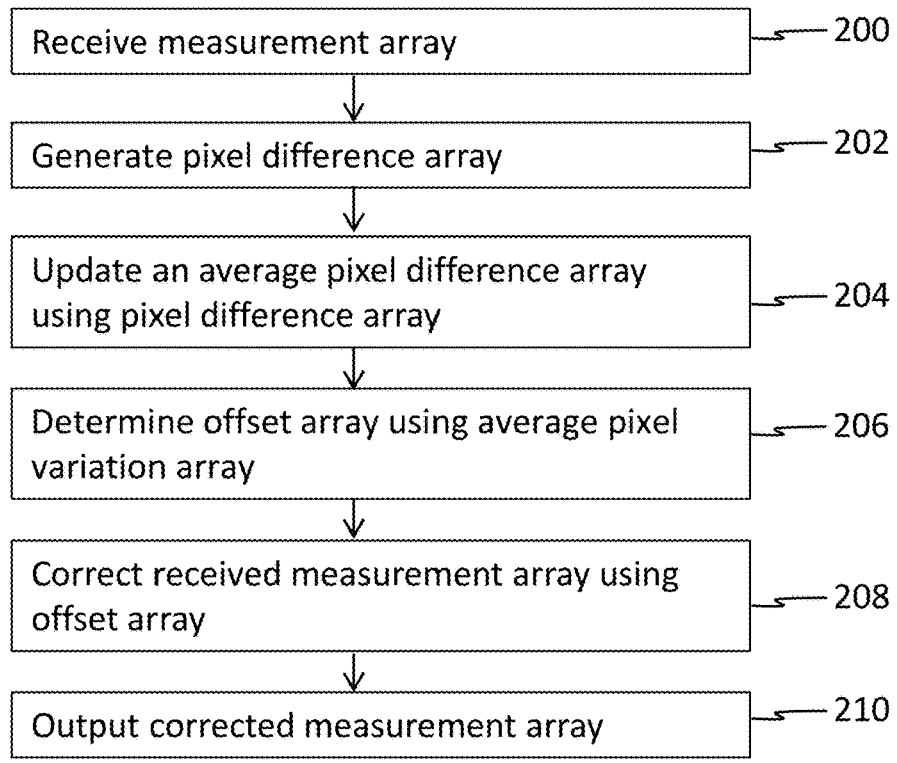
FIG. 2 is a method of image processing, according to some embodiments of the disclosure.

FIG. 2 is a method of image processing, according to some embodiments of the disclosure.

At 200, in some embodiments, a measurement array is received. Where the array includes a plurality of elements, each having a value associated with a detector of a detector array e.g. detector array 102 FIG. 1. In some embodiments, the element values have been gain compensated e.g. as described elsewhere in this document.

At 202, in some embodiments, a difference array is generated using the element values of the received measurement array. For example, where each element of the pixel difference array includes a linear combination of other array element/s.

Figures 3, 4:
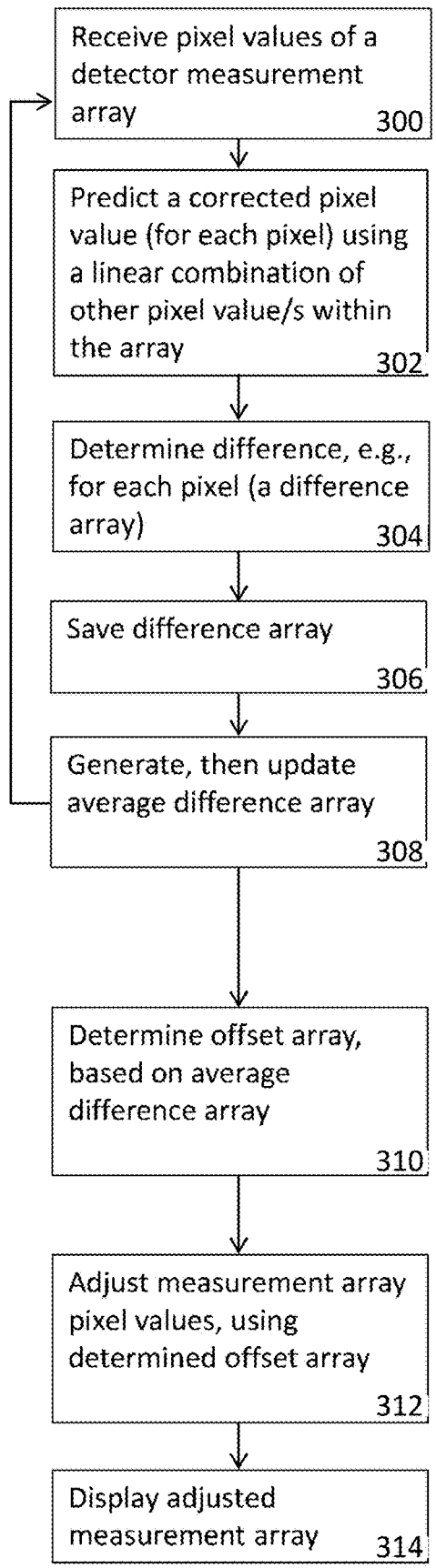
FIG. 3 is a method of image processing, according to some embodiments of the disclosure.
FIG. 4 is a simplified schematic illustrating processing of image data, according to some embodiments of the disclosure.

In some embodiments, values neighboring elements are used to provide the difference array (e.g. as illustrated in FIG. 4 e.g. regarding measurement array x, prediction array p, prediction operator A, difference array Δ, and difference operator array D).

In some embodiments, a more than one neighboring elements is used to provide each element of the difference array. For example, neighboring 2-4, or lower or higher or intermediate ranges or numbers of elements.

In some embodiments, a plurality of neighboring elements are used, but where the element's contribution is weighted reducing with increasing distance from the pixel being predicted.

A potential benefit of using larger numbers of neighboring elements is increased rapidity of arriving at an offsets array, as potentially, it enables using a smaller number of difference arrays in the average difference array.

A potential benefit of using smaller numbers of neighboring elements is a low number of mathematical operations required to produce each difference array and therefore the average difference array. A further potential benefit is increased accuracy of the offset array estimation. As, for example, further away pixels are likely to have higher differences in signal values and/or offset values.

In some embodiments, the prediction array is subtracted from the measurement array to provide a pixel difference array (also herein termed "difference array").

At 204, in some embodiments, an average pixel difference array is updated using the pixel difference array. Where, in some embodiments, the average pixel difference array is received from a memory. In some embodiments, the average is an average of previous pixel difference arrays determined for previously received measurement arrays.

In some embodiments, the averages are mean e.g. each element of the average difference array is a mean average of the values of corresponding elements of the previous difference arrays.

In some embodiments, the averages are a median e.g. each element of the average difference array is a median of the values of corresponding elements of the previous difference arrays.

In some embodiments, after a given number of difference arrays have been stored, a mean average is replaced by the median.

In some embodiments, average difference arrays are produced from up to a maximum number of historical difference arrays, where, for example, a number up to this maximal number of arrays (e.g. moving backwards in time) are used to produce the average difference array, where, optionally, older difference arrays are discarded from memory.

At 206, in some embodiments, an offset array including a determined offset for each detector (corresponding to an array element) is determined using the average pixel difference array.

At 208, in some embodiments, the received measurement array (e.g. received at step 200) is corrected using the offset array to produce a corrected measurement array.

At 210, in some embodiments, the corrected measurement array is outputted, for example, sent for display, for example by user interface/s 116 FIG. 1.

In some embodiments, during an initial data collection stage, images are not outputted or raw images outputted. For example, where a minimum number of measurement arrays are required at step 200 and associated difference arrays at step 202 are required before proceeding with one or more later steps of FIG. 2.

Alternatively, as measurement arrays are received, for example, sequentially in time, steps are performed and implemented, the average difference array being refined with successively determined difference arrays.

In some embodiments, once an offset array is determined it is used for a time period, for example, without being updated. Where, optionally, during this time, difference arrays may not be determined and/or average difference arrays may not be updated.

Where, in some embodiments, the offset array is updated periodically and/or upon identification of one or more trigger e.g. change in temperature.

FIG. 3 is a method of image processing, according to some embodiments of the disclosure.

FIG. 4 is a simplified schematic illustrating processing of image data, according to some embodiments of the disclosure.

FIG. 4, in some embodiments, illustrates exemplary data processing using the method of FIG. 3.

At 300, in some embodiments, pixel values of an image frame x (also herein termed a "measurement array") are received. In some embodiments, the received pixel values have been corrected, for example, gain corrected (e.g. according to one or more of steps 700-706 of FIG. 7).

In FIG. 4, measurement array x is illustrated as a single row/column (e.g. for ease of illustration) although the data itself may correspond to a two dimensional detector array (also herein termed "grid"). Where, for example, x corresponds to a plurality of detector array outputs (optionally gain corrected), if the detector array includes n by m detectors and there are n×m elements in x.

At 302, in some embodiments, for each pixel of the gain corrected pixel value array $x_i$, a prediction array $p_i$ pixel value is determined. Where the determining, in some embodiments, for each pixel of the prediction array $p_i$ is by a linear combination of one or more other pixels $x_{\neq i}$ in the measurement array.

FIG. 4 illustrates a "neighbor" where the linear combination for the predicted pixel value is just a replacement of each pixel with a next neighbor pixel except for a selected pixel (in FIG. 4, $x_1$) which retains its value from the measurement array. As will be detailed hereinbelow the difference array (and operator) provide relative values of offsets, where the offsets are relative to the selected pixel (in FIG. 4, $x_1$).

A prediction operator A is used to provide a prediction array p by multiplication of A with the measurement array x (p=Ax).

For example, where $p_i = \Sigma_{j \neq i} A_{ij} x_j$ is chosen such that, for a single diagonal element kk of element of a prediction operator matrix A, $A_{kk}=1$ and $A_{kj} \neq k=0$. For all other elements k'≠k, $A_{k'k}=0$ and, a sum of each row is 1 ($\Sigma_j A_{k',j}=1$).

For example referring to FIG. 4 which illustrates an exemplary prediction operator matrix A, $A_{11}=1$ and $A_{1,2}=1$. For all other elements the value is 0. The sum of each row is 1 ($\Sigma_j A_{k',j}=1$).

At 304, in some embodiments, a predication error, e.g. for each pixel, is determined to provide a difference array Δ.

Where, in some embodiments, the difference array is determined as a difference between the measurement array and the prediction array (e.g. referring to FIG. 4, where $$\Delta = x - p, \Delta_i = x_i - p_i).$$

Difference array Δ may be represented by Δ=Ex where E=(I−A) and is herein termed a "difference operator" where I is the identity matrix. Where, for example, to arrive at the difference array, a difference operator is applied to the measurement array.

The difference array corresponds to, when implementing the method illustrated in FIG. 4, difference in value between neighboring pixels, except for element $\Delta_1$.

This is as elements of difference array Δ are representative of relative corresponding offsets of the detectors, given that a single detector/element has been selected to which the other difference array values (representative of offset) for other detectors are relative to the selected detector/element. Implementation of this relative measure of offset is, for example, by setting (e.g. via selection of the prediction operator matrix A) a value of an element in the prediction array to be equal to that of the selected element of the measurement array e.g., referring to FIG. 4, $p_i = x_1$.

At 306, optionally, in some embodiments, the difference array Δ is saved e.g. in a memory (e.g. memory 114 FIG. 1).

In some embodiments, steps 300-306 are repeated for a plurality of measurement arrays. For example, to provide a plurality of difference arrays to the memory.

Where, referring back to step 300, in some embodiments, each measurement array corresponds to a measurement (e.g. an image acquired) at a time period x(t). In some embodiments, a system (e.g. system 100 FIG. 1) sequentially acquires a plurality of measurement arrays.

At 308, in some embodiments, an average difference array $\bar{\Delta}$ is generated or updated.

Where, in some embodiments, the average difference array is generated, for example, using a plurality of difference arrays (sequentially with time or otherwise) received from the memory. For example, where each element of the average difference array is determined as an average of corresponding elements of a plurality of difference arrays.

In some embodiments, the average is a mean value. In some embodiments, the average is a median value or median approximation. In some embodiments, for example, after receipt and incorporation of a number (e.g. predetermined number) of measurement arrays, the mean average is replaced with a median value or median approximation.

In some embodiments, averaging and/or updating of the average difference array includes one or more feature of step 204, FIG. 2.

Where, in some embodiments, a previous average difference array is received from a memory and is then updated using the difference array of step 306.

In some embodiments, step 308 occurs even for a first received measurement array, where the average difference array is the same as the difference array for the first received measurement array, where receipt of successive measurement arrays and updating of the average difference array then potentially improve the images outputted.

Alternatively, in some embodiments, step 308 only commences once a minimal number of measurement arrays have been received. The minimal number corresponding to, for example, a minimal number required for initial generation of the average difference array.

Optionally, in some embodiments, previously performed and/or periodically collected (e.g. by closing a shutter to acquire an offset measurement array) calibration measurements are used, for example, along with the offset array.

For example, where, in some embodiments, the determined offset array is verified using previously acquired calibration data e.g. elements of the offset array are verified upon them being verified as being within a range of calibration data values e.g. for a given temperature.

For example, where, in some embodiments, the determined offset array is combined with (e.g. averaged with) previously acquired calibration data before being used to compensate measurement arrays.

At 310, in some embodiments, an offset estimate array o is determined, using average difference array $\bar{\Delta}$.

Referring to the neighbor method as illustrated in FIG. 4, in some embodiments, the difference array average $\overline{\Delta}$ is assumed to be an array of the differences between offsets of the pixel and its neighbor:

$$\overline{\Delta}_i = o_i - o_{i+1}, \overline{\Delta}_{i+1} = o_{i+1} - o_{i+2}, \overline{\Delta}_{i+2} = o_{i+2} - o_{i+3},$$

It is possible to then express the offset elements in terms of each other and of elements of the difference array. To solve, to find the offset values, in some embodiments, relative offset values are determined, where an element of the offset array is selected to have zero offset.

Referring to the exemplary embodiment of FIG. 4, the selected element is the first element $O_1$ where setting its value to zero starts with selection of $p_1$, so that $\Delta_1 = 0$ and then $\overline{\Delta}_1 = 0$.

Once an offset (and average difference array value) is zero, then the other offsets may be determined using values of elements in the average difference array:

If $\overline{\Delta}_1 = o_1 = 0$ then:

$$\overline{\Delta}_1 = o_1 - o_2, o_2 = 0$$
$$\overline{\Delta}_2 = o_2 - o_3, o_3 = -\overline{\Delta}_2$$
$$\overline{\Delta}_3 = o_3 - o_4, o_4 = -\overline{\Delta}_2 - \overline{\Delta}_3,$$

A potential advantage of such a solution is that it is possible to determine the offsets sequentially, using their values in determining the offset of later elements of the matrix. For example, as a continuation of the immediately above equations, offset $o_4$ having been determined, may be used to determine $o_5$ e.g. without re-calculating equation:

$$\overline{\Delta}_4 = o_4 - o_5, o_5 = -\overline{\Delta}_4 - o_4$$

Referring now to mathematical inversion, so that an operator E' performed on the difference average array will provide the offset array, in some embodiments, as an I-A (the identity matrix minus the prediction operator A) array is singular having a zero row, a diagonal element of the zero row is replaced with a 1.

For example, referring to FIG. 4, where in some embodiments, the average difference array $\overline{\Delta}$ is used as an estimation of an offset estimation array o minus the difference operation if operated on the offsets:

Difference average array $\overline{\Delta}$ is considered, in some embodiments, to be an estimation of the pixel offsets minus the difference operation if operated on the offsets (offset estimation array o):

$$\overline{\Delta} = Eo$$

Matrix E always has an all zero row (row k) and therefore is a singular matrix. However, by definition, the value of $\overline{\Delta}_k$ is zero.

Therefore we can define E' to be equal to E but with A'kk=1.

Where the average difference matrix as determined as $\overline{\Delta} = E'o$ is the same as applying E to o, but sets the offset estimation for element k to zero, $o_k = 0$. For image processing purposes, in some embodiments, this is acceptable, as relative offsets may be used in image non-uniformity correction.

Therefore, multiplying by the inverse of E', $E^{-1}$:

$$E^{-1}\overline{\Delta} = E^{-1}E'o \text{ so } o = E^{-1}\overline{\Delta}$$

The offset for each element of the offset array o, may therefore be estimated by:

$$o_i = \sum_j E_{ij}^{-1} \Delta_j$$

At 312, in some embodiments, the measurement array is adjusted using the offset array to provide a corrected measurement array $x^C(t)$. Where, for example (and referring to FIG. 4):

$$x^C(t) = x(t) - o(t)$$

At 314, in some embodiments, the corrected measurement array with corrected pixel values, is displayed.

Figure 5:
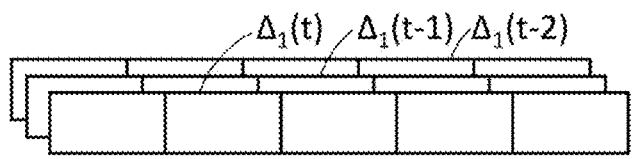
FIG. 5 is a simplified schematic illustrating processing of image data, according to some embodiments of the disclosure.

FIG. 5 is a simplified schematic illustrating processing of image data, according to some embodiments of the disclosure.

In some embodiments, a prediction operator A1 includes averaging of more than one other array value. For example, of all previously received values of the measurement array x.

Correspondingly, the difference operator E, adjusted difference operator E', and the adjusted difference operator's inverse $E^{-1}$ include weighted terms.

FIG. 5 illustrates an embodiment where data may be used once it becomes available, for example, where values of the measurement array are received sequentially. The difference array elements have increasing numbers of measurement array elements used in the linear combination of elements as the difference array element index increases. For example, calculation of the difference array occurring as the measurement array values are received.

FIGS. 6A-C are simplified schematics illustrating processing of image data, according to some embodiments of the disclosure.

FIGS. 6A-C illustrate exemplary difference $\Delta 2(t)$ and offset arrays o2, where the measurement array x is provided in matrix form.

FIGS. 6A-C illustrate an exemplary embodiment, where, for the difference array, elements sharing a row or column with the element selected for zero offset (in the illustration, central element $x_{33}$) use a neighbor difference, the neighbor used being the selected pixel or a neighboring element in a direction of the selected pixel.

Elements not sharing a row or column with the selected pixel have a difference provided by combination of two neighboring pixels, a neighboring column pixel and a neighboring row pixel. Where, in the specific embodiment illustrated in FIG. 6B, the neighboring row and column pixels are those closest to the selected pixel.

Figure 7:
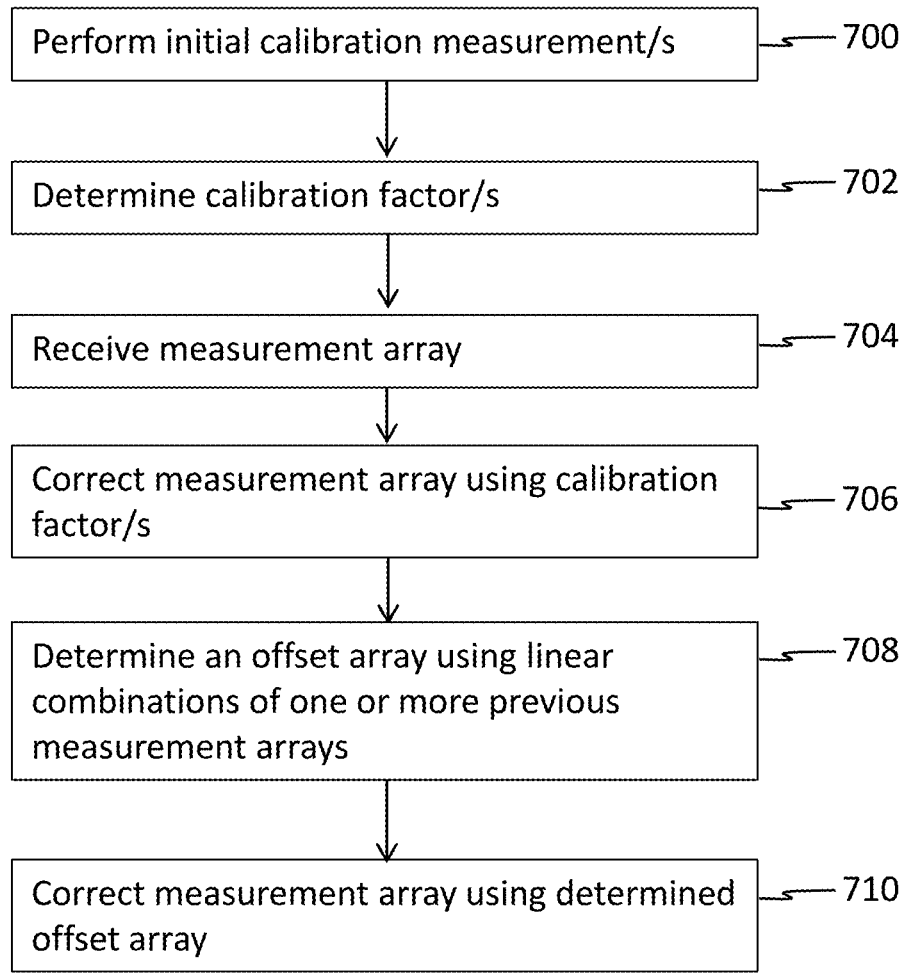
FIG. 7 is a method of image processing, according to some embodiments of the disclosure.

FIG. 7 is a method of image processing, according to some embodiments of the disclosure.

At 700, in some embodiments, initial calibration measurements are performed.

At 702, in some embodiments, calibration factor/s are determined. For example, for one or more pixel of a detection array (e.g. array 102 FIG. 1) a gain for the specific pixel is determined. For example, to provide an array of pixel gain corrections. In some embodiments, the gain calibration for each pixel (e.g. for the pixel array) is saved e.g. in a memory (e.g. memory 114 FIG. 1).

At 704, in some embodiments, a measurement array is received.

At 706, in some embodiments, the measurement array is corrected using the calibration factors (which were determined at stage 702).

At 708, in some embodiments, an offset array is determined using previously received arrays. For example, according to step/s 200-206 FIG. 2 and/or according to step/s 300-310.

At 710, in some embodiments, the measurement array is corrected using the determined offset array.

Figure 8:
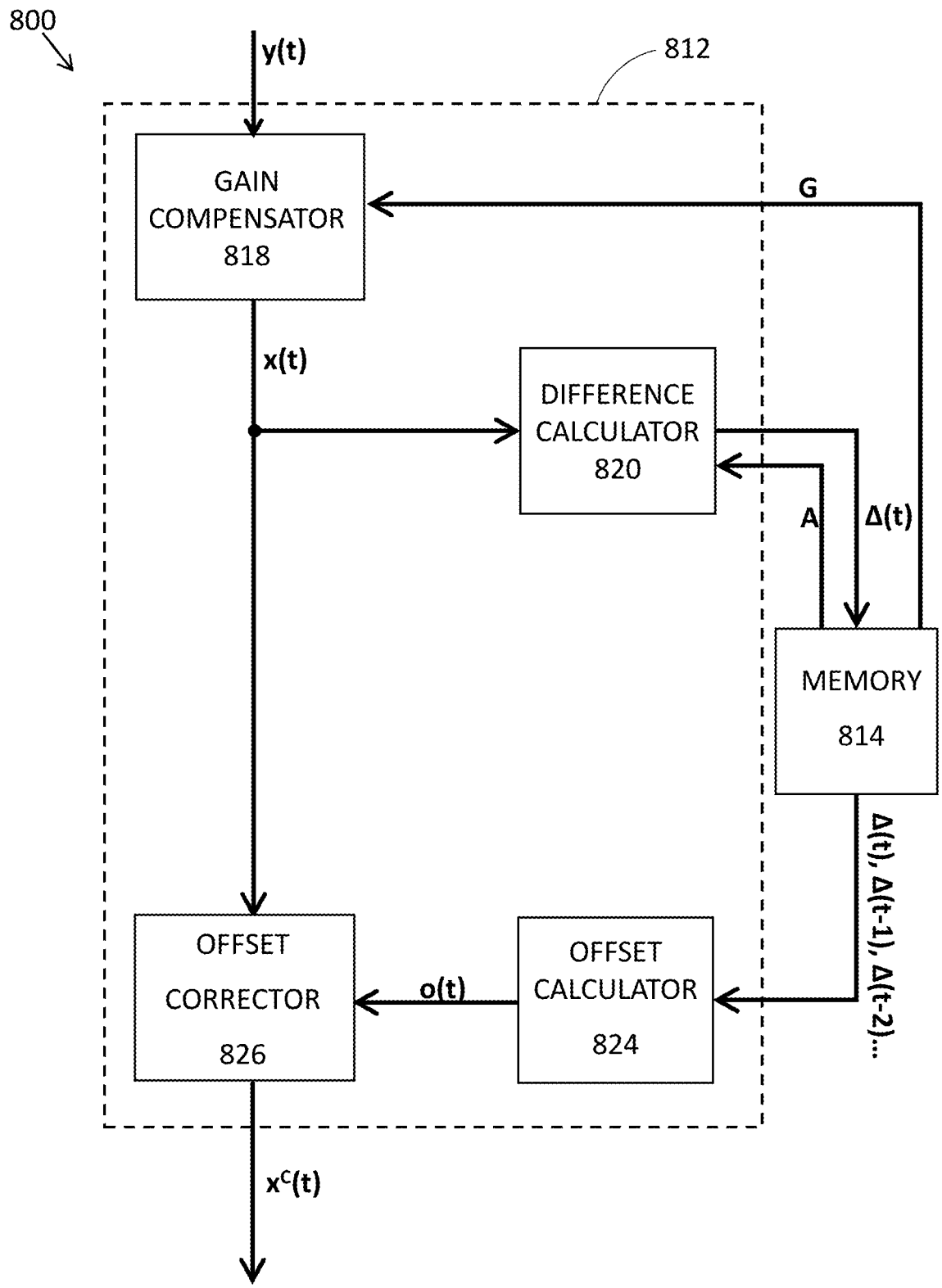
FIG. 8 is a simplified schematic block diagram of a system, according to some embodiments of the disclosure.

FIG. 8 is a simplified schematic block diagram of a system 800, according to some embodiments of the disclosure.

System 800, in some embodiments, receives, for example, repetitively, pixel measurement signal/s y(t), for example, from a detector array (e.g. detector array 102 FIG. 1). Where, in some embodiments, measurement signals y(t) include arrays of measurement values. Where, in some embodiments, measurement signals y(t) include sequentially received measurement array values and/or groups of measurement values (e.g. for a portion of a detector array).

In some embodiments, system 800 includes a gain compensator 818 which is, for example, configured to adjust measurement signal/s y(t) to compensate for non-uniformity of gain in the detector array e.g. where different detectors of the detector array have different gains. In some embodiments, the compensation is performed using previously determined gain correction values. Where, in some embodiments, the gain correction values (e.g. a matrix G) are received from a memory 814.

Optionally, in some embodiments, gain compensation values are periodically adjusted and/or updated, for example, correction values G being received by gain compensator 818 from memory 814 periodically.

In some embodiments, gain corrected measurements, e.g. measurement array x(t), are passed to a difference calculator 820 which determines, for each of a plurality of measurement arrays, a difference matrix $\Delta(t)$. Where, in some embodiments, the difference matrix is determined using a prediction operator A on x(t) e.g. as described regarding step 304 FIG. 3.

In some embodiments, prediction operator A is received by difference calculator 820 from memory 814. Where, in some embodiments, the prediction operator is updated and/or adjusted. For example, based on one or more of measured imaging conditions, and user inputted imaging requirements.

In some embodiments the difference matrix is stored by a memory 814.

In some embodiments, as measurement arrays are received, associated difference arrays are determined and, in some embodiments, are stored in memory 814.

In some embodiments, an offset calculator 824 determines an offset array from a plurality of difference arrays, for example, including $\Delta(t)$ and previously determined difference array/s e.g. $\Delta(t-1)$, $\Delta(t-2)$ . . . . In some embodiments, offset calculator 824 determines an average difference array and therefrom an offset array o(x) suitable for gain corrected measurement array x(t).

In some embodiments, an offset corrector 826 receives gain corrected measurement array x(t) and offset estimate array o(t), producing therefrom an offset corrected measurement array $x^C(t)$.

In some embodiments, one or more of gain compensator 818, difference calculator 820, offset calculator 824, and offset corrector 826 are hosted by a processor 812 e.g. processor 112 FIG. 1.

Exemplary Implementation Data

Figure 9A:
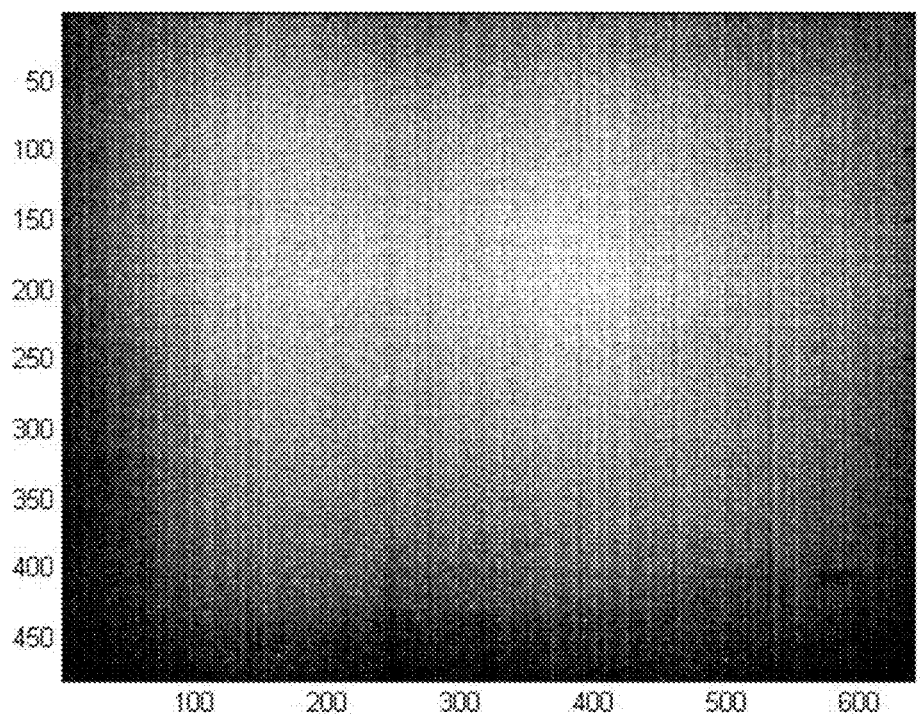
FIGS. 9A-B are images, according to some embodiments of the disclosure.
Figure 9B:
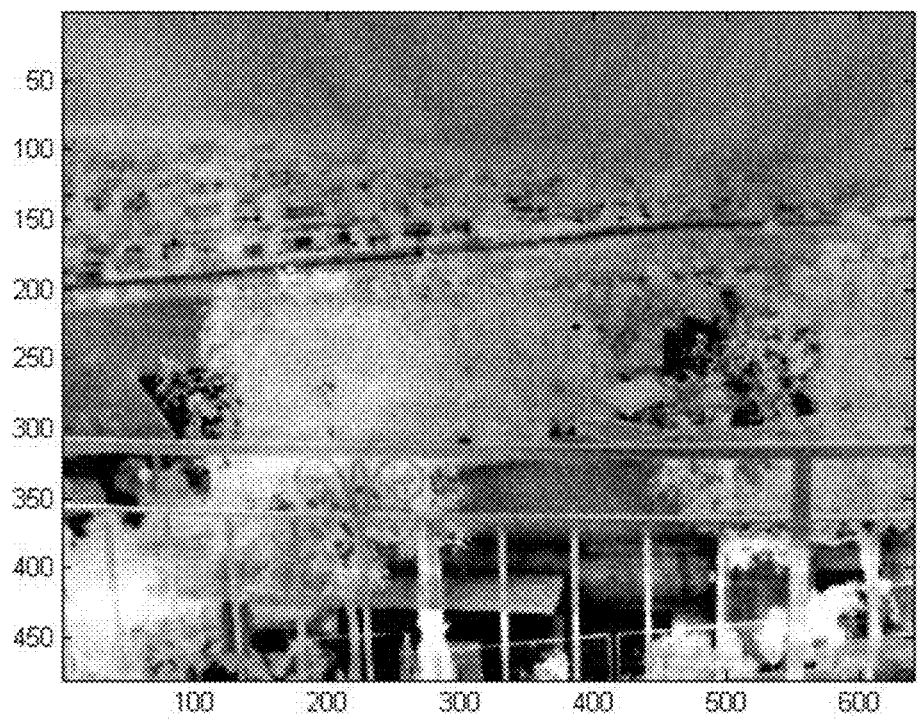

FIGS. 9A-B are images, according to some embodiments of the disclosure.

Where, in some embodiments, FIG. 9A illustrates a measurement image and FIG. 9B illustrates the same measurement image corrected using method/s described within this document.

Figure 10A:
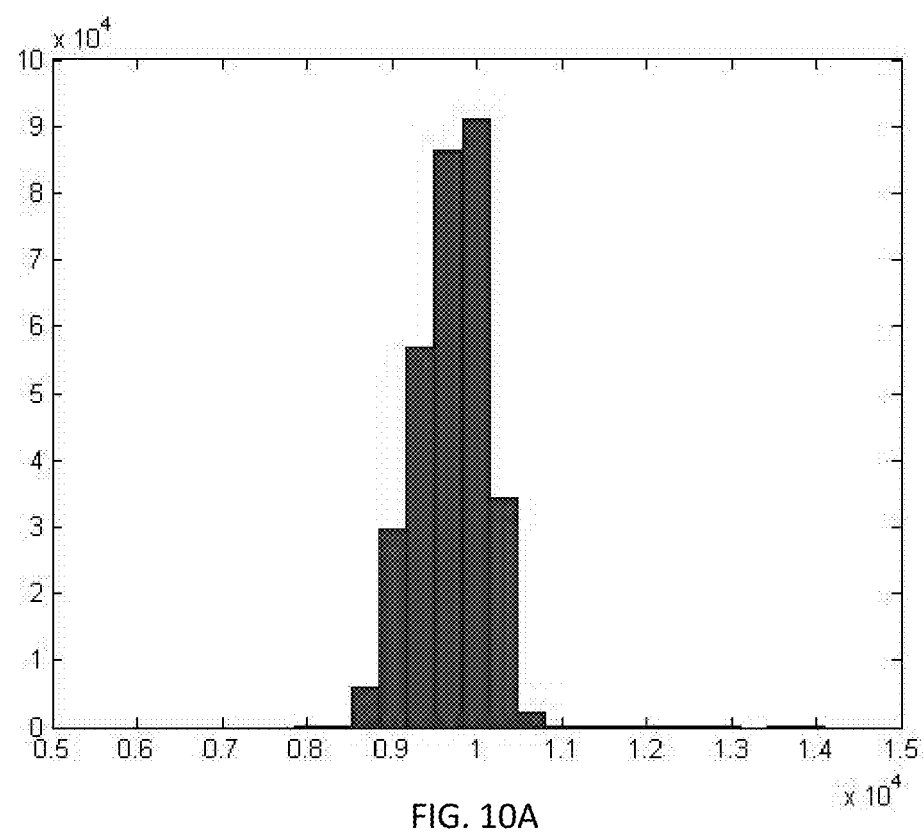
FIG. 10A is a plot of intensity distribution in a measurement array, according to some embodiments of the disclosure.

FIG. 10A is a plot of intensity distribution in a measurement array, according to some embodiments of the disclosure.

Figure 10B:
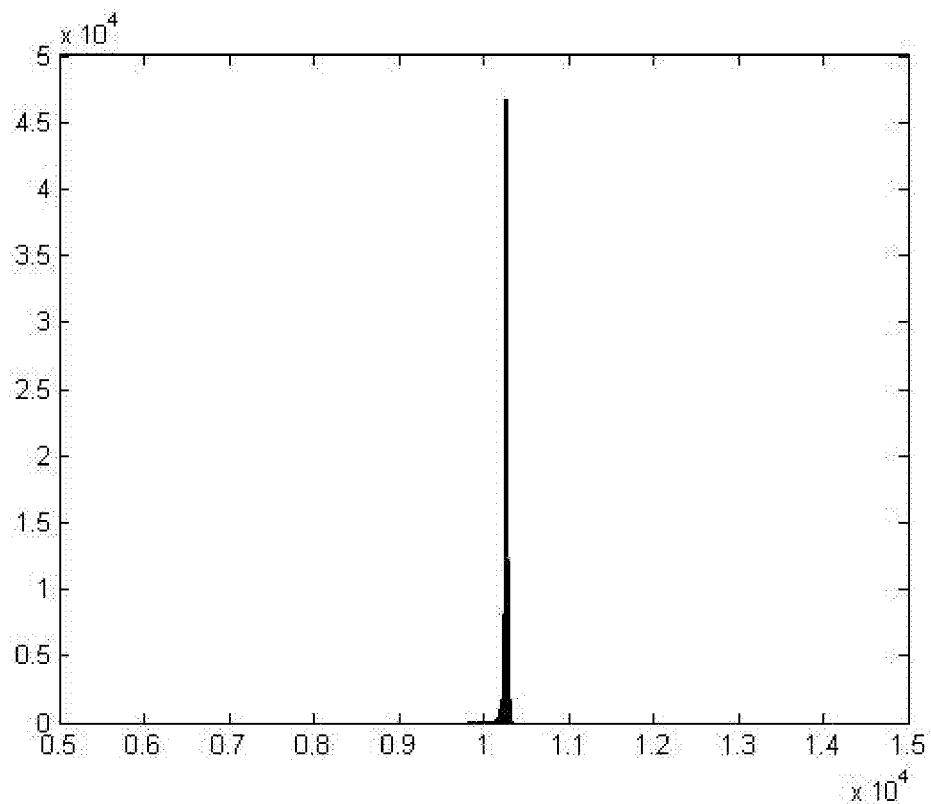
FIG. 10B is a plot of intensity distribution in an offset corrected measurement array, according to some embodiments of the disclosure.

FIG. 10B is a plot of intensity distribution in an offset corrected measurement array, according to some embodiments of the disclosure.

Where, in some embodiments, FIG. 10A illustrates intensity distribution for an un-corrected image, that of FIG. 9A and where FIG. 10B illustrates intensity distribution for a corrected image, that of FIG. 9B.

FIG. 9A, in some embodiments illustrates image data prior to offset correction. For example, the image of FIG. 9A corresponding to measurement array x(t). FIG. 9B, in some embodiments, illustrates image data after offset correction. For example, the image of FIG. 9B corresponding to corrected measurement array $x^C(t)$.

Where, in some embodiments, FIG. 10A corresponds to the image of FIG. 9A. Where, in some embodiments, FIG. 10B corresponds to the image of FIG. 9B.

Referring now to FIGS. 10A-B, visible in FIG. 10A is a much larger spread of measurement values in the raw (non-offset corrected) measurement data than that of FIG. 10B. Reflecting larger relative differences in offset between detectors than of difference in the measurement signal.

Figure 11A:
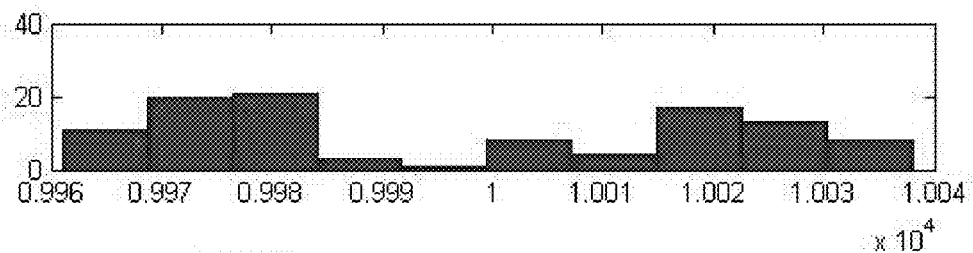
FIGS. 11A-C are histograms, each illustrating cumulative values over time of a measurement array according to some embodiments of the disclosure.
Figure 11B:
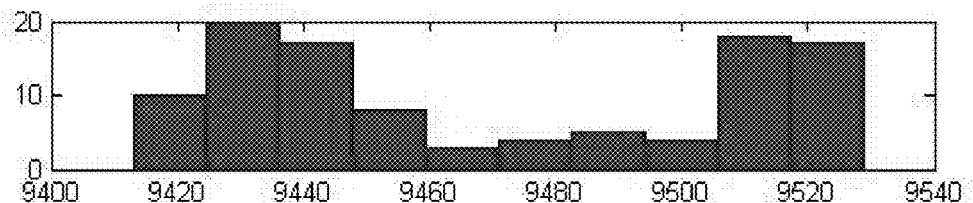
Figure 11C:
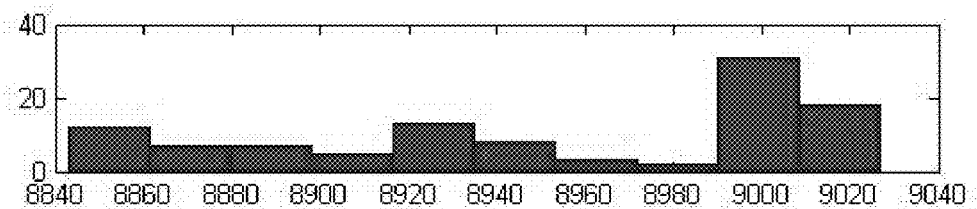

FIGS. 11A-C are histograms, each illustrating cumulative values over time of a measurement array according to some embodiments of the disclosure.

Where, in some embodiments, each of FIGS. 11A-C illustrate measured pixel values for a different array element or pixel corresponding to a single detector.

Figure 12A:
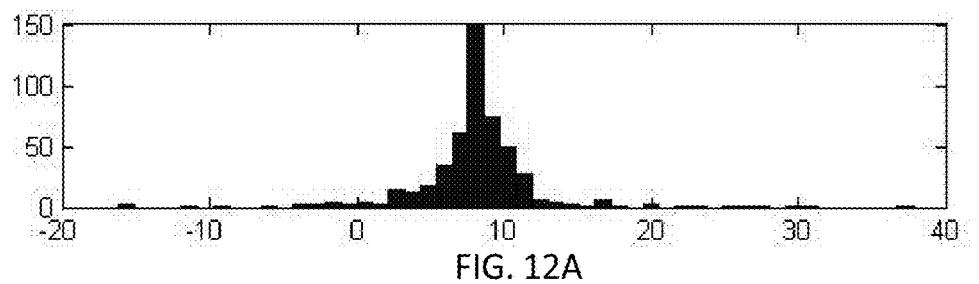
FIGS. 12A-C are histograms, each illustrating cumulative values over time of an element of a difference array, according to some embodiments of the disclosure.
Figure 12B:
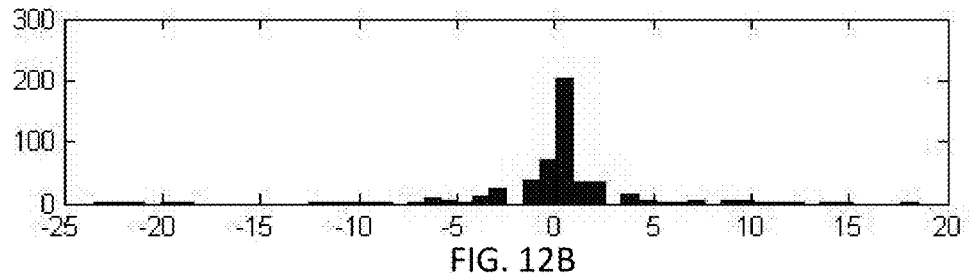
Figure 12C:
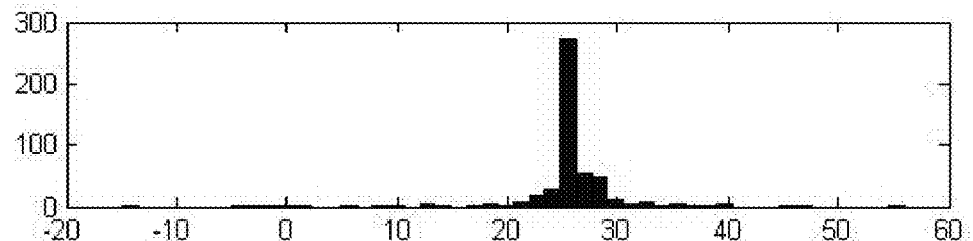

FIGS. 12A-C are histograms, each illustrating cumulative values over time of an element of a difference array, according to some embodiments of the disclosure.

Where each of FIGS. 12A-C illustrates the values of a single array element corresponding to a single pixel or detector. Visible in FIGS. 12A-B is that these difference array values, as opposed to the raw data illustrated in FIGS. 11A-B, strongly reflect the offset of the pixels and the magnitude thereof. Where, in this example, the signal variation is much lower than that of the offset. Referring to FIGS. 12A-B, the signal, apparently, has a magnitude (variation around the offset) of about 10-20 units where the offsets, apparently is about 8 in FIG. 12A, and about 0 in FIG. 12B, and about 25 in FIG. 12C.

General

As used within this document, the term "about" refers to ±20%

The terms "comprises", "comprising", "includes", "including", "having" and their conjugates mean "including but not limited to".

The term "consisting of" means "including and limited to".

As used herein, singular forms, for example, "a", "an" and "the" include plural references unless the context clearly dictates otherwise.

Within this application, various quantifications and/or expressions may include use of ranges. Range format should not be construed as an inflexible limitation on the scope of the present disclosure. Accordingly, descriptions including ranges should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within the stated range and/or subrange, for example, 1, 2, 3, 4, 5, and 6. Whenever a numerical range is indicated within this document, it is meant to include any cited numeral (fractional or integral) within the indicated range.

It is appreciated that certain features which are (e.g., for clarity) described in the context of separate embodiments, may also be provided in combination in a single embodiment. Where various features of the present disclosure, which are (e.g., for brevity) described in a context of a single embodiment, may also be provided separately or in any suitable sub-combination or may be suitable for use with any other described embodiment. Features described in the context of various embodiments are not to be considered essential features of those embodiments, unless the embodiment is inoperative without those elements.

Although the present disclosure has been described in conjunction with specific embodiments thereof, it is evident that many alternatives, modifications, and variations will be apparent to those skilled in the art. Accordingly, this application intends to embrace all such alternatives, modifications and variations that fall within the spirit and broad scope of the appended claims.

All references (e.g., publications, patents, patent applications) mentioned in this specification are herein incorporated in their entirety by reference into the specification, e.g., as if each individual publication, patent, or patent application was individually indicated to be incorporated herein by reference. Citation or identification of any reference in this application should not be construed as an admission that such reference is available as prior art to the present disclosure. In addition, any priority document(s) and/or documents related to this application (e.g., co-filed) are hereby incorporated herein by reference in its/their entirety.

Where section headings are used in this document, they should not be interpreted as necessarily limiting.

The invention claimed is:

1. An image processing method comprising:
receiving a plurality of image frames from a detector array, wherein each image frame includes a measurement array of pixel values, the plurality of image frames corresponding to a plurality of measurement arrays;
computing a difference array from each measurement array of said plurality of measurement arrays, to provide a plurality of difference arrays, a different difference array corresponding to each individual measurement array of said plurality of measurement arrays, wherein the elements of each said difference array comprise:
a selected element which is set to zero;
elements which are computed as a difference between:
a corresponding measurement array element; and
another element of the measurement array;
or
a linear combination of other elements of the measurement array;
averaging said plurality of difference arrays to provide an average difference array; and
determining an offset array using said average difference array.

2. The image processing method according to claim 1, wherein said determining an offset array includes determining an offset for each detector of said detector array, relative to said selected element of the detector array, based on assuming that said average difference array is representative of differences between offsets of the detectors.

3. The image processing method according to claim 2, wherein said plurality of image frames are produced by said detector array while said detector array moves with respect to a field of view.

4. The image processing method according to claim 1, wherein said computing, for each measurement array comprises applying a difference operator to each said measurement array.

5. The image processing method according to claim 4, wherein said determining said offset array comprises applying an inverse of said difference operator to said average difference array.

6. The image processing method according to claim 4, wherein said difference operator is selected so that said selected element of said difference array has a value of zero.

7. The image processing method according to claim 1, wherein said linear combination comprises:
for each array element except for said selected element, a difference between a neighboring measurement array element and the array element; or
an average of a sum of said other elements.

8. The image processing method according to claim 7, wherein said sum is a weighted sum of said other elements.

9. The image processing method according to claim 8, wherein said other elements comprise a plurality of neighboring measurement array elements to a measurement array element corresponding to said difference element being computed.

10. The image processing method according to claim 1, comprising receiving an additional measurement array and correcting said additional measurement array using said offset array to provide a corrected measurement array.

11. The image processing method according to claim 10, wherein said correcting comprises, for each element of said measurement array, subtracting a value of a corresponding element of said offset array.

12. The image processing method according to claim 11, comprising outputting said corrected measurement array.

13. The image processing method according to claim 10, comprising:
gain compensating each said measurement array, prior to said determining; and gain compensating said additional measurement array.

14. The image processing method according to claim 13, wherein said gain compensating comprises receiving a gain calibration value for each detector and multiplying each element of said measurement array with an associated gain calibration value.

15. The image processing method according to claim 10, comprising:

performing said computing for said additional measurement array to provide an additional difference array; and repeating:
said averaging for said for said plurality of difference arrays and said additional difference array; and
and said determining to provide an updated offset array.

16. An image processing method comprising:
receiving an image frame from a detector array, which image frame including a measurement array of pixel values;
computing a difference array where a selected element of said difference array is set to zero, and where each element of said difference array except for said selected element is computed as a difference between:
- a corresponding measurement array element; and another element of the measurement array; or
- a linear combination of other elements of the measurement array;

receiving previous difference data comprising one or more previously computed difference arrays associated with one or more previously received measurement arrays;
determining an average difference array using said difference array and said one or more previously computed difference arrays; and
determining an offset array using said average difference array.

17. A detector system comprising:
a detector array comprising a plurality of detectors, which detector array configured to provide image frames each image frame including a measurement array of pixel values, each pixel value provided by a detector of said plurality of detectors;
a processor configured to:
receive measurement arrays from said detector array;
compute, for each measurement array, a difference array, to provide a plurality of difference arrays, where a selected element of each said difference array is set to zero, and where each element of said difference array except for said selected element is computed as a difference between:
a corresponding measurement array element; and
another element of the measurement array; or
a linear combination of other elements of the measurement array;
determine an average difference array from said plurality of difference arrays; and
determine an offset array using said average difference array;
correct a received image frame, using said offset array to provide a corrected measurement array.

18. The detector system according to claim 17, comprising a memory;
wherein said detector array provides image frames sequentially with time;
wherein said processor is configured to:
compute and save sequentially in said memory said plurality of difference arrays; and
receive said plurality of difference arrays from said memory to determine said average difference array.

19. The detector system according to claim 17, wherein one or more of:
said plurality of detectors include bolometer detectors; and
said plurality of detectors are configured to detect infrared light.

20. The detector system according to claim 17, wherein said processor is configured to:
compute said difference array by applying a difference operator to a corresponding measurement array; and
determine said offset array by applying an inverse of said difference operator to said average difference array.

* * * * *